United States Patent
Blazo et al.

(10) Patent No.: US 6,272,518 B1
(45) Date of Patent: Aug. 7, 2001

(54) SYSTEM AND METHOD FOR PORTING A MULTITHREADED PROGRAM TO A JOB MODEL

(75) Inventors: Gary M. Blazo, Endwell; Kevin D. Hall, Johnson City; Chung Meng, Endicott; Kurt A. Streifert, Vestal, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/135,253

(22) Filed: Aug. 17, 1998

(51) Int. Cl.$^7$ ........................................................... G06F 9/00
(52) U.S. Cl. ................................................ 709/102; 709/100
(58) Field of Search ........................................ 709/100, 101, 709/102, 103, 104, 106, 108, 314, 231; 710/104, 129; 717/4, 5

(56) References Cited

U.S. PATENT DOCUMENTS

| | | | |
|---|---|---|---|
| 5,247,677 | 9/1993 | Welland et al. | 709/103 |
| 5,404,521 | 4/1995 | Murray | 709/104 |
| 5,421,014 | 5/1995 | Bucher | 709/100 |
| 5,485,626 | 1/1996 | Lawlor et al. | 709/315 |
| 5,504,898 | 4/1996 | Klein | 709/101 |
| 5,511,192 | 4/1996 | Shirakihara | 709/106 |

OTHER PUBLICATIONS

Iliev, R. et al. Discrete event simulation of distributed memory parallel computers at concurrent threads' level, Parallel Computing: State–of–the–Art Perspectives, 1996, pp. 637–640, INSM abstract No. 5614067.

Sande, B.I. Entity–life modeling in a distributed environment, Proceedings of the 4th International Workshop on Parallel and Distributed Real–Time Systems, pp. 35–41, IEEE Compt. Soc. Press, 1996, INSM abstract No. 5437415.

Vellejo, F. et al. Shared memory multimicroprocessor operating system with an extended Petri net model, IEEE Transactions on Parallel and Distributed Systems, Jul. 1994, pp.749–762, INSM abstract No. 4724275.

Roos, J.F. et al. Execution replay of parallel programs, Proc. Eoromicro Workshop on Parallel and Distributed Processing, 1993, pp. 429–434, INSM abstract No. 4658032.

Placide, P. et al. A consistent global state algorithm to debug distributed object–oriented applications, 2nd Int'l Workshop on Automated and Algorithmic Debugging, 1995, pp. 2330247, INSM abstract No. 5093601.

Portable Applications Standards Comm. of the IEEE Computer Society, Information Technology—Portable Operating System Interface (POSIX)—part 1: System Application Program Interface (API), Rpt. No. ISO/IEC 9945–1:1996(E), Jul. 12, 1996, INSM abstract No. 5424125.

*Primary Examiner*—Majid Banankhah
(74) *Attorney, Agent, or Firm*—Shelley M Beckstrand

(57) ABSTRACT

A system and method for porting a multi-threaded program to a job model. Data that needs to be shared between different jobs is globalized by storing data in a user space accessible to all of the jobs. Thread controls are replaced by job controls by replacing thread function calls by job commands wrappered to appear as functions.

13 Claims, 4 Drawing Sheets

# SYSTEM AND METHOD FOR PORTING A MULTITHREADED PROGRAM TO A JOB MODEL

CROSS REFERENCES TO RELATED APPLICATIONS

U.S. patent applications Ser. No. 09/135,102, filed Jan. 30, 2001, now U.S. Pat. No. 6,182,228 entitled "System and Method for Very Fast IP Packet Filtering", and Ser. No. 09/135,148, filed Aug. 17, 1998 entitled "System and Method for IP Network Address Translation and IP Filtering With Dynamic Address Resolution", assignee docket numbers EN998066 and EN998067, respectively, filed concurrently herewith are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention pertains to a method and system for porting multi-threaded application programs to a computer system supporting a job model. In particular, this invention provides for globalizing variables and wrappering job related commands thereby to function as thread function calls.

2. Background Art

In a prior art multithreaded application based on the POSIX draft standard 1003.4, threads process multiple execution environments with sharing of data as global values among threads.

Job models, such as the ILE C environment on the IBM AS/400 System, process work for application programs, but typically do not share data across jobs. There is a need in the art for a system and method for adapting code based on threading model concepts yet interfacing with an underlying job model.

It is an object of the invention to provide a system and method for implementing a job-based application on a threaded model.

It is a further object of the invention to provide a system and method for enabling sharing of data as global values among threads within a job model.

It is a further object of the invention to provide an HTTP server implemented as jobs built on a threaded model.

SUMMARY OF THE INVENTION

In accordance with the invention, a method is provided for porting a multi-threaded program to a job model, comprising the steps of globalizing data that need to be shared between different jobs by storing data in a user space accessible to all of the jobs; and replacing thread controls by job controls, including replacing thread function calls by job commands wrappered to appear as functions.

Other features and advantages of this invention will become apparent from the following detailed description of the presently preferred embodiment of the invention, taken in conjunction with the accompanying drawings.

BEST MODE FOR CARRYING OUT THE INVENTION

The invention relates to running a thread model on top of a job model. In a preferred embodiment of the invention, an HTTP server 190 is implemented as IBM System AS/400 jobs built on a threaded HTTP server.

In building a job model from a threading model, first the data that needs to be shared between the main server thread (parent job) and the worker threads (child jobs) are globalized. This is accomplished by storing globalized data in a user space that is accessible to all of the jobs. Second, the thread controls are replaced by job controls. This is done by rewriting thread specific function calls such as PthreadCreate, PthreadExit and PthreadMutexLock as AS/400 commands, API calls and MI instructions.

Figure 1:
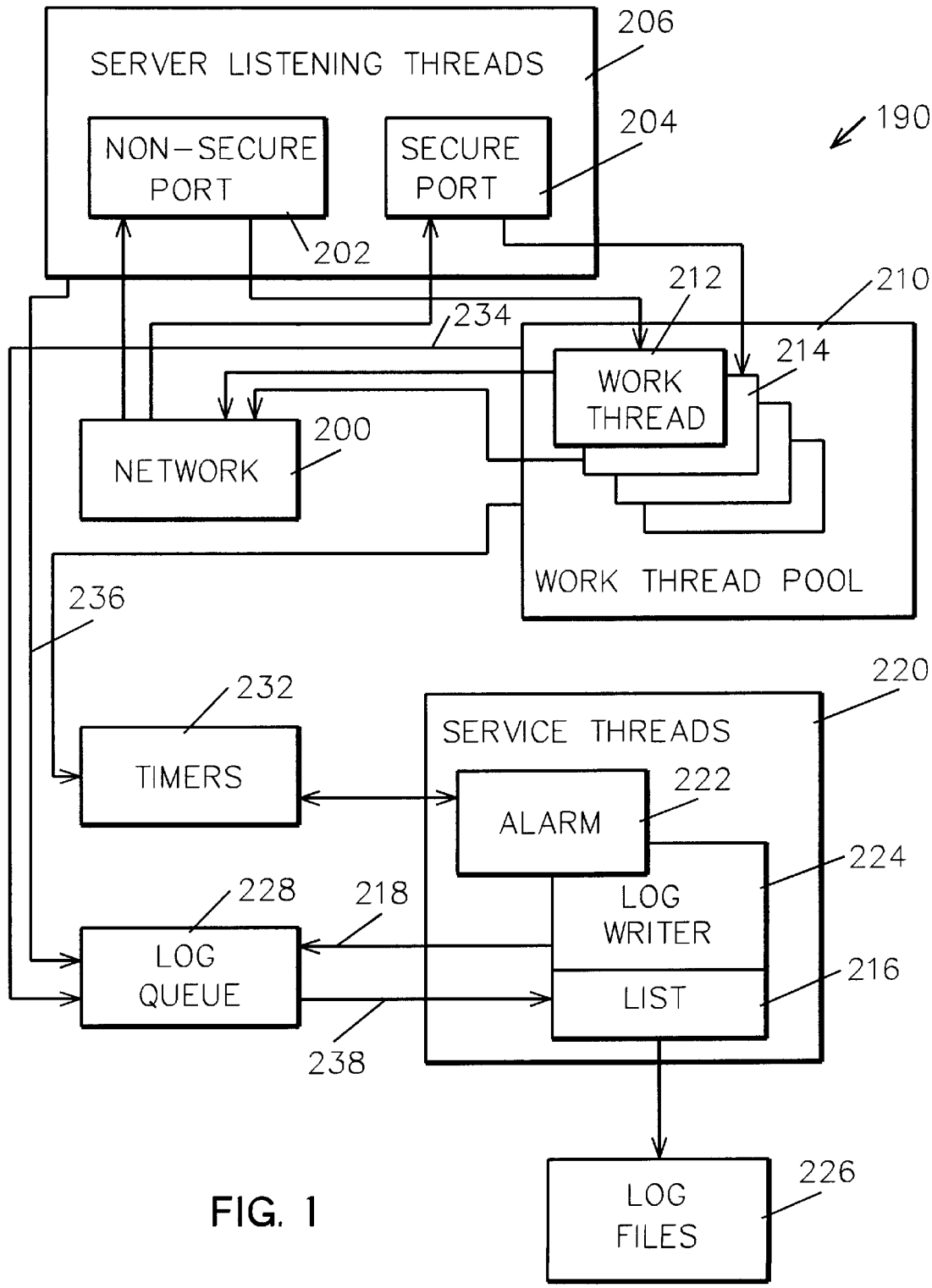
FIG. 1 is a high level system diagram illustrating server threading.

Referring to FIG. 1, in accordance with the Internet connection secure server embodiment of the invention, a server can listen on both a secure port 204 using secure sockets layer (SSL) and a non-secure port 202 using sockets for requests coming from HTTP clients on network 200. When a listening thread 206 detects a request coming into port 202 or 204 from network 200, it passes the socket descriptor for the request off to a worker thread 212 or 214 that is waiting in a thread pool 210 of initialized threads. Worker thread 212 or 214 processes the request and completes the transaction by sending a response back to the HTTP client on network 200. Service threads 220 run in the background to handle server utility functions including alarm 222 and log writer 224.

Figure 2:
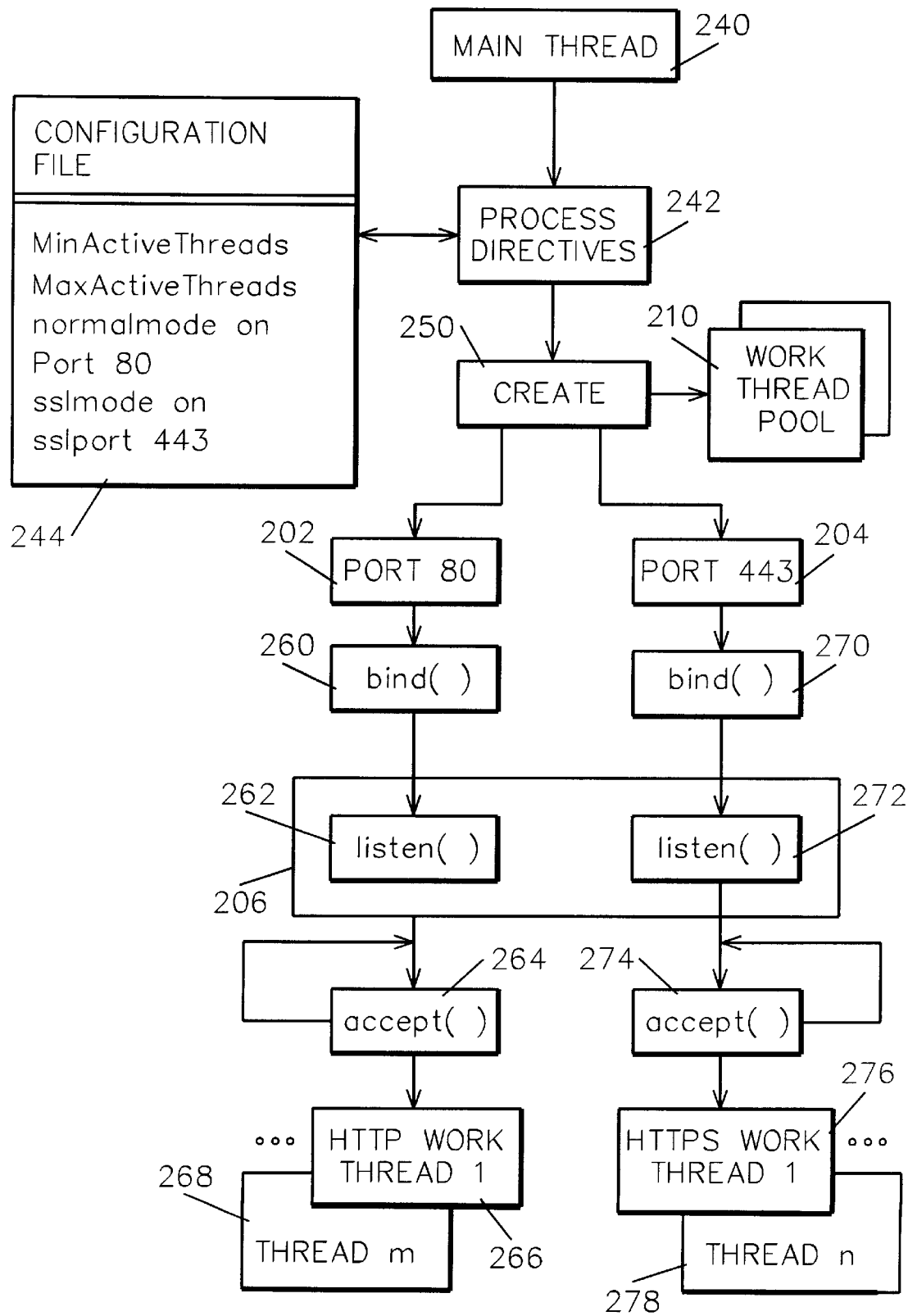
FIG. 2 is a high level flow diagram illustrating server threading flow.

Referring to FIG. 2 in connection with FIG. 1, as part of initialization, main thread 240 processes configuration file 244 directives. The MinActiveThreads and MaxActiveThreads directives are used to set the boundaries of the pool 210 of available threads that can be used by the server 190. Main program thread 240 initializes thread pool 210 and then uses a thread 202 to bind( ) 260 and listens 262 on an IP address port 202. When server 190 is started with directives normalmode on and sslmode on there will be one thread 206, 262 listening on port 80 (the HTTP default port 202) and one thread 206, 272 listening on port 443 (the HTTPS default port 204). Hereafter, these threads may be referred to as listing threads, or parent threads. HTTP and HTTPS default ports 202, 204 can be overriden with a directives port (for (HTTP) and an sslport (for HTTPS). These threads 206 will listen on all IP addresses defined for this host unless the BindSpecific directive is in configuration file 244 and it contains a valid IP address for this host. Then threads 206 only listen on the ports for that IP address.

When a request comes in on either or both ports 202, 204, the listening thread 262, 272 does an accept 264, 274 and passes the incoming request off to a work thread 266, 276 that comes from thread pool 210. Listening thread 262, 272 then goes back to accepts mode 264, 274. The work thread 266, 276 processes the incoming request and sends a response to the client. When work thread 266, 276 completes its tasks it returns to pool 210 of available threads.

Two service threads 220, including log writer thread 224 and alarm thread 222, are spun off at server 190 initialization and wait in the background until their services are needed.

Log writer routine 224 is spun off in its own thread when server 190 starts. It spends most of its time sleeping, but wakes up periodically to write out to log files 226 anything that needs to be logged. It handles writing to the access and error logs.

At initialization, startup job 240, 250 opens the log files 226 that are specified in configuration directives 244 (or over-rides) and then passes the file descriptors to the log writer thread 224. As is represented by lines 234 and 236, server listening threads 206 and worker threads 210 add log data to log queue 228 for log writer thread 224 to log. When log writer thread 224 wakes up it checks queue 228 for data to be logged. When there is data to be logged, log writer thread 224 locks the queue with a mutually exclusive (mutex) lock on line 218 and, as is represented by line 238, copies the log data from queue 228 into list 216, zeros out queue 228, and then releases mutex 218. Log writer thread 224 can then log the data from list 216 without having other threads 206, 210 blocked from writing to queue 228.

Alarm thread 222 is spun off (spawned) in its own thread when server 190 starts. It spends most of its time sleeping. It wakes up periodically and checks a list of timers 232 that are associated with active work threads 210, such as 266, 268, 276, 278. When a timer 232 expires it indicates that a work thread 210 had a problem completing its task on time. When alarm thread 222 finds an expired timer the timer is removed from the list of timers 232, the outstanding function being processed is terminated, and the socket 202, 204 being used by the request is closed.

Hereafter, when the terms "thread" and "threading" are used they are, generally, referring to a server 190 threading model that is implemented in accordance with the invention within a job model.

Figure 3:
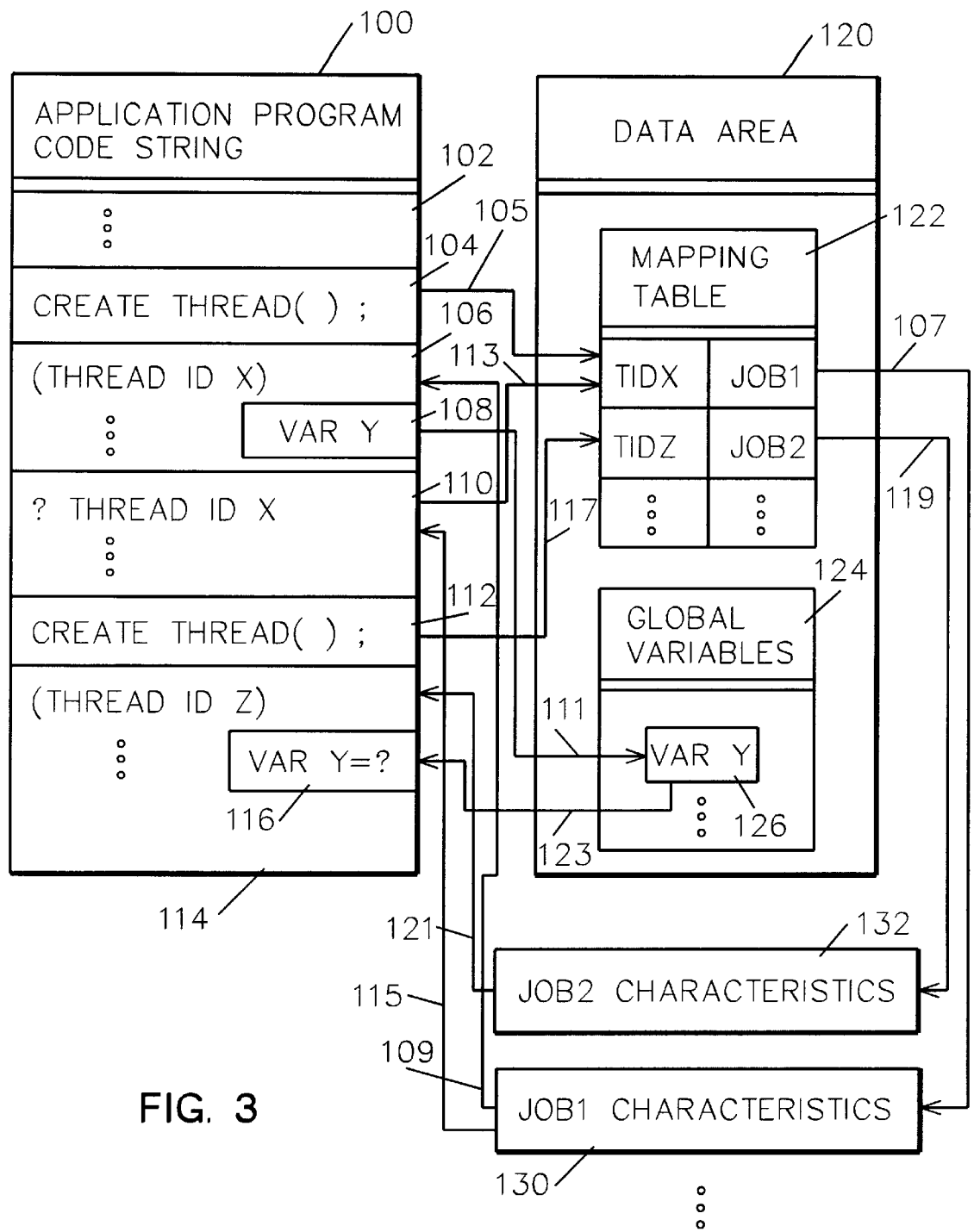
FIG. 3 illustrates the preferred embodiment of the invention for globalizing variables and wrappering jobs for use in an application program based upon a thread model.

Referring to FIG. 3, globalizing and wrappering in accordance with a preferred embodiment of the invention are presented. Application program 100 is based on a thread model, and includes a series of thread creation steps 104, 112 and thread calls 106, 114. Thread X 106 establishes a global variable VAR Y 108, and thread Z 114 requires, as is illustrated at 116, use of that VAR Y. Data area 120 includes a thread ID to job ID mapping table 122, and global variable space 124. Jobs 130, 132 reside outside of data area 120 at locations addressed by pointers 107, 119, respectively.

Variables 124 are globalized by being stored in data area 120, where they are accessible for use by steps 108, 116.

Jobs are wrappered to present themselves to program 100 as though they were threads by responding to create thread steps 104, 112 by mapping, through table 122, the respective thread identifier 105, 117 to corresponding job identifiers 107, 119, and placing in code string 106, 114 code 109, 121 derived from job characteristics 130, 132.

Referring to FIG. 3 in connection with Tables 1 and 2, application program code string 100 is implemented in Table 2 as the ICS server job model; create threads 104 is implemented at Table 2 line 6; pointer 105 to mapping table 122 is implemented at Table 2 line 115; (thread ID X) 106 is implemented at Table 2 line 90; pointers 107, 119 from mapping table 122 to job characteristics 130 is implemented at Table 2 lines 122, 133; VAR Y 108 is implemented at Table 2 lines 108–109; pointers 109, 115 and 121 from job characteristics 130, 132 are implemented a Table 2 lines 134–141; ? thread ID X 110 is implemented at Table 2 line 90; pointer 111 to VAR Y 126 is implemented at Table 2 line 110; create threads 112 is implemented at Table 2 line 6; pointer 113 to mapping table 122 is implemented at Table 2 line 115; (thread ID Z) 114 is implemented at Table 2 line 90; VAR Y=? 116 is implemented at Table 2 lines 108, 109; pointer 117 to mapping table 122 is implemented at Table 2 line 115; data area 120 is implemented in Table 2 lines 4, 58, and 90 as PJOBSTRUCT; mapping table 122 is implemented at Table 1 lines 28, 29; pointer 123 to VAR Y=? 116 is implmented at Table 2 line 110; global variables table 124 is implemented at Table 1 line 18; VAR Y entry 126 within table 124 is implemented at Table 1 line 28 ; and job characteristics 130, 132 is implemented as structure __HOTTHREAD at Table 1 line 29 and Table 2 lines 125, 127 and 145.

Figure 4:
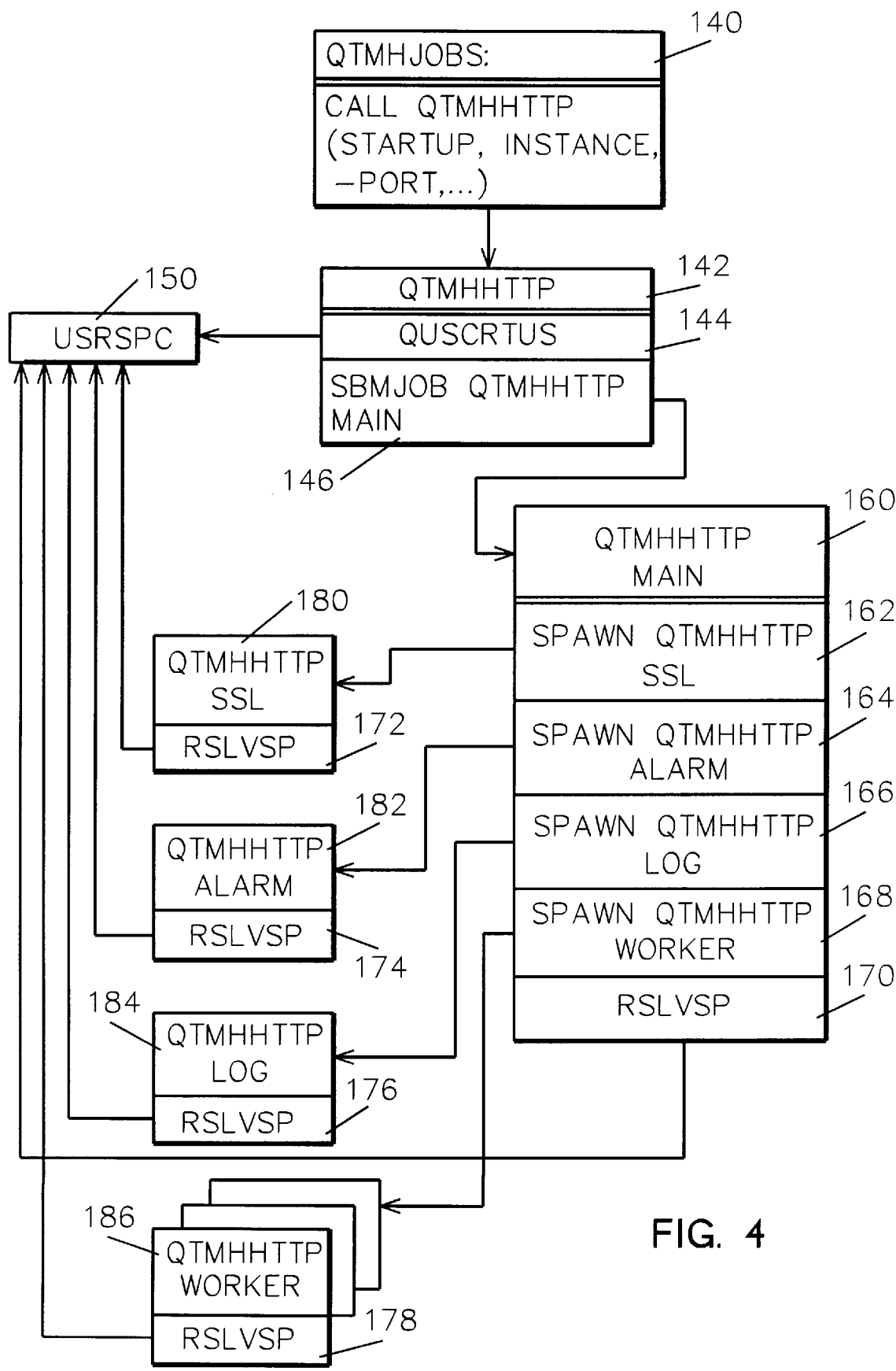
FIG. 4 illustrates the job structure of the HTTP server of the preferred embodiment of the invention.

Referring to FIG. 4, the manner in which the code set forth in Tables 1 through 8A,B, is next described. HTTP server 190 (that is, QTMHHTTP) is set up in block 140 and started in block 142. These steps are implemented by Table 3 lines 21–23. QUSCRTUS 144 is implemented by Table 4 lines 1 through 40. SBM job QTMHHTTP Main 146 is implemented by Table 5. QTMHHTTP 160 is implemented by Table 6B line 1. USRSPC 150 is implemented by Table 6A. Spawn QTMHHTTP SSL 162 is implemented by Table 6B line 17. Spawn QTMHHTTP ALARM 164 is implemented by Table 6B line 27. Spawn QTMHHTTP LOG 166 is implemented by Table 6B line 81. Spawn QTMHHTTP WORKER 168 is implemented by Table 6B line 46. RSLVSP 170, 172, 174, 176, and 178 are implemented by Table 7, which also describes Table 2 line 90. QTMHHTTP SSL 180 is a main( ) routine implemented by Table 6B lines 1 and 17. QTMHHTTP ALARM 182 is a main( ) routine implemented by Table 6B lines 1 and 27. QTMHHTTP LOG 184 is a main( ) routine implemented by Table 6B lines 1 and 81. QTMHHTTP WORKER 186 is a main( ) routine implemented by Table 6B lines 1 and 46.

Referring further to FIG. 4, in operation, in accordance with a specific embodiment of the invention, various AS/400 jobs are started to support an HTTP server 190. The purpose of the jobs is analogous to those of a thread version. For example, a main job 160 is created that will then create additional jobs SSL 180, alarm 182, log 184, and worker 178. Upon properly configuring SSL, a spawn( ) 162 is issued to create job SSL 180 that will then listen 272 on port 204 for https requests. This job SSL 180 becomes a listening, or parent job to, for example, worker jobs 186. In addition, a number of worker jobs 186 are created (spawn 168) that are kept in a pool and at a later time are dispensed as appropriate with units of work (either requests for documents or to execute CGI programs). Finally, spawn log 166 creates log job 184 and spawn alarm 164 creates alarm job 182. USRSPC 150 is used to share global data across these jobs. USRSPC 150 is a system domain object that is uniquely named per server or worker job instance with the instance name and is located in the QHTTP library.

Referring to Table 1, pseudo code (in C-like syntax) sets forth the content of the ICS server thread jobs file thrdjobs.h. This file is included in Table 2 at line 3, and provides various declarations, definitions, and structures used in the server job model, as will be more fully described hereafter.

Referring to Table 2, pseudo code (in C-like syntax) sets forth the ICS server job model. At lines 6 and 7, the function pthread_create( ) is defined. This function pthread_create( ) includes the parameters passed to allow the server job model to simulate the corresponding thread function. This will be done hereafter by spawning the required jobs using the C-language spawn function. At line 58, variables are initialized and space is created in memory for the global variables that need to be shared between listener job 206 and worker jobs 210 and other jobs 220. At line 90, a spawned job (for example, HTTP work thread 1 job 266) identifies the memory location of the listener job (for this example, listen( ) job 262) to enable worker job 266 to access the global variables defined by the listener job. At line 105, * thread_malloc( ) creates a list of worker threads 210 used to dispatch threads using a job model. At lines 115–117, the listener job (say, 262) looks for an idle worker job in list, or pool, 210 and dispatches to that worker job the specific work to be done. In the specific embodiment of this server example, the work being done may be to look up a document the listening thread 262 needs to return to a client (on network 200) that has requested a web page.

Referring to Table 3, high level pseudo code describes create job, the C function main ( ), which calls the various functions discussed in connection with table 2.

Referring to Table 4, high level pseudo code describes the process for creating user space, which is the global shared space needed for sharing global variables.

Referring to Table 5, the C code used to create a batch job to start the server. The parameters defined are those needed to start the job. At line 5 both user( ) and main( ) are named qtmhhttp. Lines 6 and 7 specify that messages out to library qusersys are identified a user identifier of qtmhhttp.

Referring to Table 6A, an expanded version of Table 1 lines 18–22 provides C code definitions for all variables inside global shared space 124 used by all the jobs. Lines 2, 4–8, 242–245, 252 define the most important. Line 2 defines the structure _jobstruct{ }. Lines 4–8 use the C function mutex to define the names of the worker and server jobs, with both having the same name. Lines 242–245 define memory space where unique worker job information is kept. Line 252 defines the name given to structure jobstruct. Line 253 allows other modules access to the unique pointer, pSpacePtr, to jobstruct. Line 254 defines a unique mapping of name jobdata to pointer pSpacePtr.

Referring to Table 6B, C code for the spawn function is provided. This provides a more complete statement of the pseudo code statement of the server job model set forth in Table 2. Spawn is a C language function provided by include file qp0z1170.h.

Referring to Table 7, a high level pseudo code statement is provided for the resolve user space function of line 90 in Table 2.

Referring to Table 8A, a high level pseudo code statement is provided of the start thread function. This defines the process for starting a thread in the simulated job model, and relates to line 6 of Table 2 where code is provided to create pthread and spawn a job. Table 8 line 27 through line 37 describes line 115 of Table 2.

Referring to Table 8B, the thread wrapper function is described. In this example, the mutex function is implemented.

Referring to further and in more detail to Tables 1 and 2 in connection with FIG. 3, in Table 1 the thrdjobs.h include file is described for the ICS server jobmodel of Table 2. Tables 1 and 2 are a pseudo code representation (C-like in syntax and structure), of application program 100, together with data area 120, of FIG. 3.

Referring to Table 1, pseudo code (in C-like syntax) sets forth the content of the ICS server thread jobs file thrdjobs.h. This file is included in the ICS server job model, Table 2, at line 3, and provides various declarations, definitions, and structures used in the server job model, as follows:

| | |
|---|---|
| line 2 | includes file qp0z1170.h This file brings the spawn procedure, which allows creation of new jobs to simulate threads. |

-continued

| | |
|---|---|
| lines 3,4 | define substitution variables. For example, during compilation, the compiler will substitute pid_t for pthread_t. |
| lines 5–10 | define variables |
| line 11 | define substitution. In this case, substitute for pthread_getspecific(a,b) @as400)_t_private. The "@", or address operator, indicates location where information is stored. |
| line 12 | define substitution. In this case, the compiler will make all occurences of pthread_keycreate() null, or blank. |
| lines 13–17 | define an in line procedure pthread_self(). This procedure calls a function that returns the process number pid of the job being run. |
| lines 18–22 | define the structure _JOBSTRUCT. Inside the structure is a list of variable definitions, variables which can be referenced through this structure. Defining _JOBSTRUCT at this point sets aside a portion of memory to hold these key variables. A key variable is thread_pool which will be used to provide a list of worker jobs ready to be dispatched for executing a process. |
| lines 23 | declares the structure JOBSTRUCT as external, thus allowing other code modules to use the job structure defined at line 18. |
| line 24 | define substitution. Replace JOBDATA with pSpacePtr wherever the latter appears. |
| lines 25–28 | more substitution definitions. |
| line 28 | substitutes (((PJOBSTRUCT)JOBDATA)->thread_pool) for thread_pool wherever the latter appears, and substitutes pSpacePtr (from line 24) for JOBDATA. The value for pSpacePtr is assigned in Table 2 at line 70. |
| lines 29–40 | defines structure _HOTTHREAD. This structure holds characteristics unique to each job in thread pool 210. |
| line 32 | ThreadID is a unique identifier for this job; this is the process id. |
| line 33 | pThreadArg is a number that identifies this job as a worker job, log job, alarm job, or secure socket layer (SSL) job. |
| line 34 | ThreadIdle is a number which tells whether this job is actively working or waiting for something to do. |
| line 35 | bDoomed is a number which tells whether this job is no longer needed, and will soon go away. |
| line 36 | inUse is a number which tells whether this job is in use. |
| line 37 | jobinfo is the process id of this particular worker job. |
| line 38 | *listner_jobid is a pointer to listener_job, the listener job 206 that will call this worker job 210. |
| line 39 | several structures exist for each worker job, this line tells which structure is being executed at this time. "this" is a C++ function that returns the location in memory where this block is located. |
| line 40 | defines *PHOTTHREAD as the pointer to the structure referred to by name HOTTHREAD. |

Referring to Table 2 , pseudo code in C-like syntax sets forth the jobmodel of the ICS server 190, as follows:

| | |
|---|---|
| line 2 | includes file qp0z1170.h. This file brings in the spawn procedure, which provides for creation of new jobs to simulate threads. |
| line 3 | includes thrdjobs.h, Table 1. |

-continued

| | |
|---|---|
| lines 4–5 | define memory space for variables pSpacePtr and as400_t_private. The latter is used to store unique information about this thread job. In threads protocol, all threads share all variables. The question in a job model is how to handle something that is unique to a particular thread. This variable as400_t_private allows sharing of information unique to a worker thread implemented as a job. |
| lines 6–7 | define the function pthread_create(), which is a thread function to be simulated using a job model. This function includes the parameters required to be passed to do the work. |
| line 9 | defines a variable "inheritance" the worker job will inherit from the parent (listener thread 206) when started. "inheritance" is defined in line 2, and is provided in the include file qp0z1170.h. |
| line 10 | *inh is a pointer to the inheritance variable. |
| line 11 | SPAWN_FDCLOSED specifies that spawn is to be closed. That is, after spawning, the file descriptor will be closed. This means that upon receiving the initializing parameters from the parent (listening) job, subsequent changes to those parameters will not be allowed by the child, or worker job. |
| line 12 | initializes the set of initializing environmental variables (parameters) required for the spawn. |
| line 13 | initializes the set of arguments required for spawn; these are also initializing variables. |
| line 14 | initializes the return variable; when done, a return_value = 0 means the spawn was successful. |
| line 15 | buffer[3] is a temporary variable used to store a user-selected name of the job being spawned. |
| line 16 | buffer1[11] is a holder for a unique number the purpose of which is to identify which job in the worker pool is to be used. This is called two times: when spawned, a unique number is entered; then later on, when the job starts, this unique nunber is used to place this job in proper place in hot thread structure defined at Table 1 line 29. The number buffer[11] points to the location in memory allocated at Table 1 line 21 which contains the structure for this worker thread. The hot thread structure identifies which worker jobs are active, and for each the listener job which activated it. |
| line 17 | *Pid is a pointer that will identify the job once the spawn is successful. Here, *Pid is initialized to zero. |
| line 18 | initializes the variable &inherit (inheritance defines what is inside that variable). |
| lines 19,20 | set unique flags that define how inherit is to occur. |
| line 19 | In C, inherit includes the parameter sigmask. Sigmask (signal mask) is here set for the particular job being spawned to the value that is defined in line 21 as sigmask (which is now 0, to which it was set in line 19. |
| line 22 | defines a group that is set to the process id of the group being spawned for this job. A group is something unique to Unix: each group of jobs in Unix has certain specific authorities and characteristics. |
| line 23 | buffer[0] defines which kind of job is required - an argument is passed which defines the job as a worker, SSL, alarm or log job. Line 27 specifies SSL, line 31 ALARM, line 35 WORKER, and line 40 LOG. |
| line 24 | which_instance defines this server's name. Multiple servers can be executing, and this provides a unique identifier for this server job. |
| lines 26–44 | identify and select the job type. For example. . . |
| line 26 | tests if the routine parameter from line 7 is for a secure socket layer job, and |
| lines 27–28 | if so, spawns an SSL job. |
| line 36 | for a worker job, cargv[3] passes a unique offset to a structure which defines the worker job being referenced. |
| line 46 | defines function do_index(). This creates a table to be used by a worker job when spawned to determine which is the parent (listener) job that spawned it. |
| lines 47–49 | are internal variable definitions for creating or adding information to the table defined at line 46. |
| line 50 | initializes some error condition variables. |
| line 51 | initializes some error variables. |
| line 52 | gets the parent job identifier. |
| line 53 | attempts to create a job table index if one doesn't exist, and if the index exists, or after it is created, writes parent information into it. Information written includes the name of the particular thread job instance and the parent job identifier. |
| line 54 | test. |
| line 55–56 | if test not successful, table already exists; add name and job information to the table. This table associates name of parent (listener) job with a specific worker or other job to enable that worker or other job, when spawned, to look up which parent (listener) job created it. |
| line 58 | initializes the parent information which the worker will need. |
| lines 59–60 | local variable declarations. |
| lines 62–63 | initialize error checking. |
| lines 68 | calls do_index() procedure defined in line 46. |
| line 70 | creates a temporary space for the table defined at line 18 of table 1. |
| lines 72–73 | get process id of parent, with which a child (a generic term for worker, SSL, alarm and log, etc.) job can get job information of parent. |
| lines 75–76 | initializes structure defined at Table 1 line 18: provides access to variableA and variableB. |
| line 78 | attempts to get temporary space for structure PJOBSTRUCT, which is called at Table 2 line 70. |
| lines 79–82 | defines structure _CONTIG needed to get temporary space. |
| line 86 | initializes the temporary variable needed from line 79. |
| line 87 | gets temporary space in memory. |
| line 88 | returns temporary memory location for the space creation template back to calling routine. |
| line 90–93 | code, including local variables, used by a spawned worker or other job upon being awakened to identify its parent. |
| line 97 | spawned job knows name of parent from line 90 and goes to data index table to look up job information required by spawned job to communicate with listener (parent) job. |
| line 101 | with parent information, spawned job gets pointer to structure JOBSTRUCT defined at Table 1 line 18. |
| line 102 | spawned job now has pointer needed to access the shared structure which defines all of the variables initialized by listener (parent) job. |
| line 105 | threadk_malloc creates new threads for simulation of thread function using the job model. |

| lines | description |
|---|---|
| lines 106–114 | initialize the global variable thread_pool preliminary to creation of new thread jobs. |
| lines 115–117 | parent listener job looks for and finds a worker job. |
| lines 119–120 | initialize local variables |
| lines 115–145 | parent job goes through thread pool structure to find an available worker job and will then give the worker a job to do on line 127. If parent can't find a worker job, it will attempt to start a new worker job at line 139. Once a new worker job is started, parent will give that worker job the work that needs to be done on line 143. |

TABLE 1 thrdjobs.h : ICS Server Thread Jobs

```
/* This code represent the include file thrdjobs.h for the pseudo code */
#include <qp0z1170.h>
#define pthread_t           pid_t
#define THREAD_ID           pthread_t
typedef void*               pthread_attr_t;
typedef void*               pthread_cond_t;
typedef void*               pthread_condattr_t;
typedef int                 pthread_key_t;
typedef void*               (*pthread_startroutine_t)(void *);
typedef void                (*pthread_destructor_t)(void *);
#define pthread_getspecific(a,b) &as400_t_private;
#define pthread_keycreate(a,b)
inline pthread_t pthread_self(void){
        pid_t pid;
        pid=getpid();
        return(pid);
}
    typedef struct _JOBSTRUCT }                                         /*124*/
    int variableA;    /* global variable definition */
    int variableB;
    HOTTHREAD thread_pool[MAX_WORKER_THREADS + 1];
} JOBSTRUCT, *PJOBSTRUCT;
extern JOBSTRUCT *pSpaceptr;
#define JOBDATA pSpacePtr
/* utility macros to access the data members */
#define variableA          (((PJOBSTRUCT)JOBDATA)->variableA)
#define variableB          (((PJOBSTRUCT)JOBDATA)->variableB)
#define thread_pool        (((PJOBSTRUCT)JOBDATA)->thread_pool)         /*122,126*/
typedef struct _HOTTHREAD                                               /*122,130,132*/
{
    void             (* THREAD_LINKAGE ppThreadAddr) (void *);
    THREAD_ID        ThreadID;
    int              pThreadArg;
    volatile int ThreadIdle;           /*___cs() compares 4 bytes     */
    volatile int bDoomed;
    volatile int inUse;
    QP0W_Job_ID_T jobinfo;
    char           *listner_jobid;
    inline osEventSem Run_hev_addr() { return &this->Run_hev_blk; }
}    HOTTHREAD, *PHOTTHREAD;
```

TABLE 2 sample.c : ICS Server Job Model

```
/* This is the pseudo code for the jobmodel of the ICS Server */      /*100*/
#include <qp0z1170.h>
#include thrdjobs.h
PJOBSTRUCT pSpacePtr;                                                  /*120*/
th_private as400_t_private;
int pthread_create(pid_t *Pid, pthread_attr_t *attr,                   /*104,112*/
                   pthread_startroutine_t routine, int arg)
{
    struct inheritance        inherit;
    const struct inheritance  *inh = &inherit;
    int vec[1] = {SPAWN_FDCLOSED};
    char                      *cenvp[1] = { NULL };
    char                      *cargv[5]= {NULL, NULL, NULL, NULL, NULL };
    int return_value=0;
    char buffer[3];
```

TABLE 2-continued sample.c : ICS Server Job Model

```
        char buffer1[11];
        *Pid=0;
        memset(&inherit, 0, sizeof(struct inheritance));
        inherit.flags = SPAWN_SETSIGMASK;
        inherit.pgroup = SPAWN_NEWPGROUP;
        sigfillset (&inherit.sigmask);
        cargv[0] = fmt1_program_name;
        cargv[1] = buffer;
        cargv[2] = which instance;
        if ((routine) = = (ssl_aixthd server_loop)){
            buffer[0] = SSL;
            sslPID=*Pid = spawn(ssl_aixthd server_loop, 0, NULL, inh, cargv, cenvp);
        }
        else if((routine) = = (HTDoAlarm_thread)){
            buffer[0] = ALARM;
            alarmPID=*Pid = spawn(HTDoAlarm_thread, 1, vec, inh, cargv, cenvp);
        }
        else if((routine) = = (HotThread)){
            buffer[0] = WORKER;
            cargv[3] = _itoa(arg, buffer1, 10);
            *Pid = spawn(HotThread, 1, vec, inh, cargv, cenvp);
        }
        else if( (routine) = = (HTLogWriter_thread)) }
            buffer[0] = LOG;
            logPID1=logPID=*Pid = spawn(HTLogwriter_thread, i, vec, inh, cargv,
              cenvp);
        }
        return(return_value);
}
void do_index() }
    QPOW_Job_ID_T  jobinfo;
    QPOW_Job_ID_T  jobinfo_current;
    int return_code;
    memset((void *)&err, '\0', sizeof(err));
    err.Bytes_Provided = sizeof(err);
    Qp0wGetJobID(pthread_self(), &jobinfo_current);        /* get parent job id */
    return_code=createDataIndex (pszInstanceName, &jobinfo_current);
    if(return_code= =0) return;
    /* if the Data index was already created, just add this one to it */
    addDataIndex(pszInstanceName, &jobinfo_current);
}
void server_start_init (char *instance) {                               /*120*/
    int return_code;
    pid_t pid;
    memset((void *)&err, '\0', sizeof(err));
    err.Bytes_Provided = sizeof(err);
    /*------------------------------------------------*/
    /* Add the instance name to the data index */
    /*------------------------------------------------*/
    do_index();
    pSpacePtr = (PJOBSTRUCT)getQTempspace (pszInstanceName);
    pid=getpid();
    return_code=Qp0wGetJobID(pid, &jobinfo_current);       /* get parent job id */
    variableA=0; /* initiaiize global variables */
    variableB=0;
}
void *getQTempspace (char *instance) }
        struct _CONTIG }
            _CRTS_Template_T     s_tpl;
            _CRTS Ext_Template_T s_tpl ext;
        }tpls;
    /*------------------------------------------------*/
    /* Initiaiize space creation templates        */
    /*------------------------------------------------*/
    InitSpaceTemplate(&align.tpls.s_tpl, &align.tpls.s_tpl_ext, iSize, instance);
    _CRTS(&pTempSpace, &align.tpls.s_tpl);
    return setsppfp(pTempSpace);
}/* @A2A*/
void resolve_user_space (char *instance) {                  /*106,110,114,120*/
    _SYSPTR            pSysPtr;
    QP0W_Job_ID_T      parentjobinfo;
    int return_code;
    /*------------------------------------------------*/
    /* First find the jobid in the data index for this instance    */
    /*------------------------------------------------*/
    return_code=getDataIndex(pszInstanceName, &parentjobinfo);
    /*------------------------------------------------*/
```

TABLE 2-continued sample.c : ICS Server Job Model

```
    /* Get the user space                                */
    /*----------------------------------------------------*/
        pSysPtr    = getQTEMPObj(pszInstanceName, &parentjobinfo);
        pSpacePtr  =(PJOBSTRUCT) setsppfp(pSysPtr);
}
void *thread_malloc(size_t size){
        int i = 0
        for(;i<MAX_WORKER_THREADS;i++) {
            if(thread_pool[i].inUse==NO) {                              /*108,116*/
                thread_pool[i].inuse==YES;                              /*108,116*/
                return (void *)&(thread_pool[i]);                       /*111,123*/
            }
        }
        return NULL;
/* end thread_malloc */
THREAD_ID RunOnThread( void (* THREAD_LINKAGE ppTAddr) (void *),        /*105,113,117*/
                            int pTArg,
                            THREAD_CREATE_OPTION CreationOption )
{
    PHOTTHREAD Thread;
        int            offset;
        while (Thread != NULL) {
            if(Thread->ThreadIdle == TRUE)                              /*107,119*/
                    /* We found an idle, waiting thread...use it. */
                    Thread->listner_jobid = jobi0400.Int_Job_ID;        /*132*/
                    /* givedescriptor to selected work thread */
                    givedescriptor (pTArg, Thread->jobinfo. jobid);     /*132*/
                    Thread = Next(Thread);
            }/* end if */
            /* If we couldn't use a "hot" thread, then start a new one. */
            if (Thread == NULL) {
                Thread =(HOTTHREAD *) thread_malloc( sizeof(HOTTHREAD));  /*107,119*/
                Thread->ThreadID     = BAD_THREAD_ID;                    /*121,109,115*/
                Thread->ppThreadAddr = NULL;                             /*121,109,115*/
                Thread->pThreadArg   = NULL;                             /*121,109,115*/
                Thread->ThreadIdle   = FALSE;                            /*121,109,115*/
                Thread->bDoomed      = FALSE;                            /*121,109,115*/
                Thread->ThreadID = StartThread(HotThread,
                                    (void *) &offset);                   /*121,109,115*/
                Thread->listner jobid = jobi0400.Int_Job_ID;             /*121,109,115*/
                        /* givedescriptor to selected work thread */
                givedescriptor(pTArg, Thread->jobinfo.jobid);
            }
        return Thread->ThreadID;                                         /*130,132*/
}
```

TABLE 3

QTMHJOBS Create Job

```
*********************** START qtmhjobs.c 140–142) ***********************
INT main( INT argc, CHAR *argv[])
    /* Register the cancel handler - this registration MUST occur here     */
    /* GetCurrentJobInfo(); Need jobid, data area flags, etc.              */
    /* Assign pointers                                                     */
    /* Retrieve Attr and Instance Name                                     */
    /* Intialize return parameter to error, reset to success if all goes well */
    /* Open Attribute File/Mbr to get attribute information.               */
    /* Get Attribute file/mbr for this Server Attribute.                   */
    /* concatenate options taken from attributes file.                     */
    /* Start/End ADMIN Server First.                                       */
    /* Retrieve Admin Port from the Service table.                         */
    /* Get Instance Overrides.                                             */
    /* Get Instance file/mbr for this Server Instance.                     */
    /* Concatinate the attributes followed by the instance then the command */
    /*    options.                                                         */
    /* Check to see if Instance file has an AutoStartN tag. Don't start    */
    /*    this Instance if the tag does exist.                             */
    /* Start this Instance of the Server.                                  */
    /* Parse if Attributes is not a Null                                   */
    /* Call Qtmhhttp to setup Server                                       */
    /* initialize argv[0] = qtmhhttp.pgm                                   */
    /* Call Qtmhhttp to initialize server                                  */
    /* Restore the success return parameter Qtmherrno = errno;             */
```

TABLE 3-continued

QTMHJOBS Create Job

```
    /* find errno if there is an error                                    */
************************ END qtmhjobs. c (140–142)************************
```

TABLE 4

QUSCRTUS Create User Space

```
************************ Start qtmhutil.c (144) ****************************
/* Createspace()                                                          */
/* This function will destroy a user space using either the _CRTS() MI call */
/* or the QUSCRTUS API call. We also make the user space autoextendable by */
/* calling either the mods2() MI call or the QUSCUSAT AFI to change the   */
/* attributes.
/*
/* Note:    we use the global pszSpcLib for the library to create the space. */
/*          we use the global pszProfileName to change ownership.          */
/* Returns true if space create, else returns false (space may already exist) */
/*-----------------------------------------------------------------------*/
/* Force the _CRTS templates to be contiguous for proper math calculations */
/* later. We have thrown in the unused pointer to insure 16-byte boundary  */
/* alignment even though both templates contain pointer members.          */
/*-----------------------------------------------------------------------*/
/*-----------------------------------------------------------------------*/
/* Create a user space                                                    */
/* CPF9870 - Object &2 type *&5 already exists in library &3.             */
/* We have a special case where we are using user domain user spaces, but */
/* we will fail at security levels 40 and up if the QALWUSRDMN value is not */
/* set to let us create in our private application library. Therefore, we */
/* must trap any CPFxxxx exceptions, check the settings of QSECURITY and  */
/* QALWUSRDMN and post a message indicating the QALWUSRDMN must include our */
/* application library if it does not already. We may get a different     */
/* message using the _CRTQ() as compared to the QUSCRTUS AFI call...      */
/*                                                                        */
/* CPFxxxx - Object domain error....                                      */
/*-----------------------------------------------------------------------*/
/*-----------------------------------------------------------------------*/
/* Insure pszProfileName has *ALL access to the user space               */
/* Don't really need to change the ownership of QTEMP objects.           */
/*-----------------------------------------------------------------------*/
/*-----------------------------------------------------------------------*/
/* Change the owner to be whatever is in global pszProfileName           */
/*-----------------------------------------------------------------------*/
/* Try to resolve to the space address.                                   */
/* Transform system pointer into space pointer...                         */
************************ END qtmhutil.c (144) ****************************
```

TABLE 5

QTMHHTTP MAIN

```
************************ START HTDaemon.c (146) ********************
PRIVATE int submit_main(int argc, char **argv) {
sprintf(cmd, cmd_fmt, pgmname, args, jobname, sbmjobccsid);
const char cmd_fmtY = "QSYS/SBMJOB CMD(CALL PGM(%s) PARM(%s))
JOB(%s) JOBD (QTCP/QTMHHTTP) PRTDEV(*JOBD) OUTQ (*JOBD) USER(QTMHHTTP)
RTGDTA(HTTPWWW) SYSLIBL(*SYSVAL) CURLIB(QTCP) INLLIBL(*JOBD)
MSGQ(QUSRSYS/QTMHHTTP) CCSID(%s)";
************************ End HTDaemon.c (146) ********************
```

TABLE 6A

USRSPC HTJobs

```
************************ START HTJobs.h (150) ********************
typedef struct _JOBSTRUCT {
/* HTJobs.c */
     char which_instance[11];
     union{
          char * temp_spawn;
          osMutexSem spawn_mutex;       /* Mutex for spawn */
```

TABLE 6A-continued

USRSPC HTJobs

```
        ;
        union{
                char * pjob;
                QPOW_Job_ID_T parjobinfo;
        ;
        union
                char * sjob;
                QPOW_Job_ID_T ssljobinfo;
        ;
        volatile  THREAD_ID  parPID;
        volatile  THREAD_ID  sslPID;
        volatile  THREAD_ID  alarmPID;
        volatile  THREAD_ID  logPID;
                  THREAD_ID  logPID1;
        volatile  THREAD_ID  gcPID;
        volatile  THREAD_ID  restartPID;
        volatile  int        endJob;
/* HTDaemon.c */
        int             HTSRC_buddy_on    ;   /* is buddy system active?*/
        int             thread_serial     ;   /* current # activehandler threads
        int             thread_total      ;   /* total number of threads spawned
        int             ssl_soc           ;   /* fd of ssl socket */
        char            *HTloguser        ;   /* APIplug */
        char *          user_df_module    ;
        char *          user_df_open_name ;
        char *          user_df_write_name;
        char *          user_df_close_name;   /* HTAAServ      */
        time_t          theTime           ;   /* HTAAProt                */
        HTList *        prot_cache        ;   /* Protection setup cache. */
        osMutexSem      Prot_new_mtx      ;   /* was private            */
        HTAAProt *      HTSysProt         ;
        HTAAProt *      HTsysProtCache    ;   /* HTAccess               */
        char *          HTCacheDir        ;   /* Root for cached files, */
                                              /*    0 for nocache       */
        FILE *          HTlogfile         ;   /*= 0 File to output 1-liners*/
/* HTAnchor */
        HTList **adult_table              ;   /* Point to tbl of lists allparents
*/
/* HTAtom */
        HTAtom * hash_table[HASH_SIZE"    ;   /* was private */
        HTAtom *WWW_SOURCE                ;
        HTAtom *WWW_PRESENT               ;
        HTAtom *WWW_MIME                  ;
        HTAtom *WWW_PRINT                 ;
        HTAtom *WWW_UNKNOWN               ;
        HTAtom *WWW_POSTSCRIPT            ;
        HTAtom *WWW_RICHTEXT              ;
        HTAtom *WWW_AUDIO                 ;
        HTAtom *WWW_BINARY                ;
        HTAtom *WWW_BOOKMASTER            ;
        HTAtom *WWW_ENC_7BIT              ;
        HTAtom *WWW_ENC_8BIT              ;
        HTAtom *WWW_ENC_EBCDIC            ;
        HTAtom *WWW_ENC_BINARY            ;
        HTAtom *WWW_ENC_COMPRESS          ;
/* HTAuth */
        osMutexSem decompose_auth_string_mtx  ;   /* was private */
/* HTCache */
        HASHTABLE LocalCachetable         ;
        unsigned long KBytesReadFromCache ;
        unsigned BytesReadFromCache       ;
        unsigned long iCacheRequests      ;
        unsigned long iCacheHits          ;
        unsigned long iCacheRamInUse      ;
        unsigned long iCachedFiles        ;
        unsigned long iCacheAdds          ;
        unsigned long iCacheRemovals      ;
/* HTConfig */
        union {
            char *sc_ALIGN;
            HTServerConfig      sc;
        ;
        union {
            char *rc_ALIGN;
            HTResourceConfig    rc;
        ;
        union {
```

TABLE 6A-continued

USRSPC HTJobs

```
            char *cc_ALIGN;
            HTCacheConfig        cc;
        BOOL                     HTconfig_firstTime    ;
        int                      HTBindHostNm          ;
        BOOL                     bIsNTService          ;
/* HTFWrite */
        HTList * HTCache                               ;
/* HTFile */
        HTList * HTSuffixes                            ;
        HTSuffix no_suffix                             ;
        HTSuffix unknown_suffix                        ;
/* HTIcons */
        HTIconNode * icon_unknown                      ;    /* Unknown file type */
        HTIconNode * icon_blank                        ;    /* Blank icon in hding*/
        HTIconNode * icon_parent                       ;    /* Parent directory icon */
        HTIconNode * icon_dir                          ;    /* Directory icon */
        HTList * icons                                 ;    /* from private */
        HTList * hrefs                                 ;    /* from private */
/* HTLog */
        osMutexSem Log_mtx                             ;
        HTList_Queue LogQueue                          ;
        HTList_Queue LogQueue2                         ;
        a_counter                LogQueueSize
        _SYSPTR        actv_QPtr;         /* ptr to log queue    */
        FILE *   access_log;               /* ptr to access log   */
        FILE *   proxy_log;                /* ptr to proxy log    */
        FILE *   cache_log;                /* ptr to cache log    */
        FILE *   error_log;                /* ptr to error log    */
        FILE *   agent_log;                /* ptr to agent log    */
        FILE *   referer_log;              /* ptr to refer log    */
        int local_ctrace;
        HTList *LogFilters;
        char * aln                                     ;
        char * pln                                     ;
        char * cln                                     ;
        char * eln                                     ;
        char * sln                                     ;
        char * agent_log_name                          ;
        char * referer_log_name                        ;
        volatile BOOL tried_opening_errorlog           ;
/*HTMulti.c */
        HTList *                 welcome_names[2];
/* HTRestrt */
        osMutexSem               ReloadSemaphore;
        volatile int ssl_restart_pending;
        volatile int log_restart_pending;
/* HTSGLOB */
        int                      HTServerPort;
        char **                  ext_env;
        long                     HTcacheusage;
        int                      HTChildExitStatus;
        long                     HTCachedBytes;
        BOOL                     trace_cache;
        BOOL                     trace_all;
/* HTTimer */
        HTList *                 HTTimers;
        HTTimer *                KnownTimers[MAX WORKER THREADS + 1];
        int                      MaxTimers;
        int                      TimerSlot;
        osMutexSem               KnownTimers_mtx;
        int                      AlarmThreadRunning;        /* from private */
/* HTTrace */
        BOOL                     HTTrace_modules[MAX_MODULE + 1];
        FILE *                   trace_log;
/* HTUID gmb removed these*/
        HTUidGid *               HTDefIds; */
/* HTVInit */
        osMutexSem               hash_mtx;
        osMutexSem               adult_mtx;
        osMutexSem               news_mtx;
        osMutexSem               authent_mtx;
        osMutexSem               free_presentations_mtx;
/* counters */
        unsigned int             iLibSNMPOutboundAssociations;
        time_t                   iLastOutboundActivity;
/* data */
        int                      WWW_TraceFlag;
```

TABLE 6A-continued

USRSPC HTJobs

| | |
|---|---|
| int | HTDirReadme; |
| int | HTDirAccess; |
| BOOL | HTSuffixCaseSense; |
| char * | HTSaveLocallyDir; |
| unsigned int | HTDirShowMask; |
| int | HTDirInfo; |
| BOOL | HTDirDescriptions; |
| BOOL | HTDirShowBytes; |
| int | HTDirMinFileLength; |
| int | HTDirMaxFileLength; |
| int | HTDirMaxDescrLength; |
| BOOL | HTDirShowBrackets; |
| CONST char * | HTLibraryVersion; |
| char * | HT_AppName; |
| char * | HT_Version; |
| a_counter | nThreads; |
| ServerProxyType | ServerProxy_dll; |
| HTAtom * | WWW_HTML; |
| HTAtom * | WWW_SSI; |
| HTAtom * | WWW_PLAINTEXT; |
| HTAtom * | HTMIMEConvert_name; |
| HTAtom * | HTWSRCConvert_name; |
| HTAtom * | HTHACKWrapper_name; |
| HTAtom * | HTMIMEWrapper_name; |
| int | iThreadsMin_dll; |
| int | iThreadsMax_dll; |
| BOOL | HTpeekTitles; |
| a_counter | nThreadsActive; |
| a_counter | nThreadsStarted; |
| a_counter | nThreadsExpired; |
| BOOL | HTRuleCaseSense; |
| THREAD_KEY | HTThreadKey; |
| /* LSTAT */ | |
| int | nConnections; |
| unsigned long | nTotalConnections; |
| unsigned long | nTotalKBytes; |
| /* osthread */ | |
| int | iThreadsExpiry        ; |
| BOOL | fDisable        ; |
| osEventSem | Idle_hev        ; |
| a_counter | workerKillCount        ; |
| /* ourmib */ | |
| char * | EntityContact        ; |
| char * | EntityName        ; |
| char * | EntityCommunity        ; |
| unsigned long | EntityAddress        ; |
| unsigned int | EntityPort        ; |
| int | EntityType        ; |
| unsigned int | SummaryRequests        ; |
| unsigned int | SummaryRequestErrors        ; |
| unsigned int | SummaryRequestDiscards        ; |
| unsigned int | SummaryResponses        ; |
| unsigned int | SummaryResponseDiscards        ; |
| unsigned int | SummaryInUnknowns        ; |
| unsigned int | SummaryInBytes        ; |
| unsigned int | SummaryOutBytes        ; |
| unsigned int | TotalTimeouts        ; |
| unsigned long | LastTimeoutRemoteAddressIndex; |
| unsigned int | applUptime        ; |
| int | applOperStatus        ; |
| unsigned int | applLastChange        ; |
| unsigned int | applInboundAssociations        ; |
| unsigned int | applOutboundAssociations; |
| unsigned int | applAccumulatedInboundAssociations; |
| unsigned int | applAccumulatedoutboundAssociations; |
| unsigned int | applLastInboundActivity        ; |
| unsigned int | applLastOutboundActivity; |
| unsigned int | applRejectedInboundAssociations; |
| unsigned int | applFailedOutboundAssociations; |
| unsigned int | total_current_threads        ; |
| unsigned int | max_threads        ; |
| unsigned int | rnin threads        ; |
| /* qtmhend */ | |
| volatile int | terminateReason; |
| volatile int | logShutdownDone; |
| /* qtmhffdc */ | |
| int | FFDCnoLog; |

TABLE 6A-continued

USRSPC HTJobs

```
    union {
        char *p_tpool;              /* start of tpool stuff, also 16 byte align */
        HOTTHREAD thread_pool[MAX_WORKER_THREADS + 1];
    };
    union {
        char *p_last;
        HTLocalHeap nv_heap;        /* turn the rest of this user space into a
                                       private storage heap. This has to be the
                                       last item in this structure!!!!! */
    };
JOBSTRUCT, *PJOBSTRUCT;
extern JOBSTRUCT *pSpacePtr;
#define JOBDATA pSpacePtr
*********************** END HTJobs.h (150) ******************************
```

TABLE 6B

Spawn QTMHHTTP

```
************************ START HTDaemon. c (160–168) ***********************
main (argv, argc)
PRIVATE void HTTPD_call_job(int argc, char **argv)
    which_job = (which_job_enum)    *argv[1];
    instance=argv[2];
    switch (which_job)
        case STARTUP        :
            server_start_init(instance);
            /* Be sure QTMHHTTP is not disabled before start */
            check_disabled();
            break;
        case MAIN           :
            server_start_init(instance);
            CTRACE(stderr, "HTTPD_call_job:.called MAIN\n");
            parPID=pthread_self();
            Format1ProgramName (argv[0]);
            break;
        case SSL            :
            #pragma cancel_handler(CancelHandlerForSSL, cancel_code)
            resolve_user_space(instance);
            CTRACE(stderr, "HTTPD_call_job: .called SSL\n");
            jobs_start_init ();
            Format1ProgramName (argv[O]);
            ssl aixthd_server_loop(NULL);
            abort();
            #pragma disable_handler
            break;
        case ALARM          :
            #pragma cancel_handler(CancelHandlerForAlarm, cancel_code)
            resolve_user_space(instance);
            CTRACE(stderr, "HTTPD call_job:.called
            ALARM\n")
            jobs_start_init ();
            HTDoAlarm_thread(NULL);
            abort();
            #pragma disable_handler
            break;
        case GC             :
            #pragma cancel_handler(CancelHandlerForGarbage, cancel_code)
            resolve_user_space(instance);
            CTRACE(stderr, "HTTPD call_job:.called GC\n");
            jobs_start_init ();
            HTDoGC_thread(NULL);
            abort();
            #pragma disable_handler
            break;
        case WORKER         :
            #pragma cancel_handler(CancelHandlerForWorker, cancel_code)
            resolve_user_space(instance);
            CTRACE(stderr, "HTTPD_call_job:.called
            WORKER\n");
            jobs_start_init ();
            offset=atoi(argv[3]);
            HotThread((void *)&offset);
            abort();
```

TABLE 6B-continued

Spawn QTMHHTTP

```
            #pragma disable_handler
            break;
        case RESTART       :
            if (resolve_user_spacel(instance)){
                char msg_key[4];                  /* message key          */
                int parm_len = 55;
                char *repl_buf;                   /* replacement data     */
                repl_buf = (char*)calloc(1, parm_len);
                Qus_EC_t Error_Code;
                memcpy(Error_Code.Exception_Id, "       ", 7);
                Error_Code.Bytes Provided = 0; /* Errors returned via */
                pstartup_error = (int *)argv[1];
                *pstartup_error = -1;
                exit(0);
            };
            CTRACE(stderr, "HTTPD_call_job:.called RESTART\n");
            if (kill(parPID,SIGHUP) = = -1) {
                int err = errno;
                CTRACE(stderr, "KILL(SIGHUP) failed with errno %d\n"1, err);
                pstartup_error = (int *)argv[1];
                *pstartup_error = -1
            }
            pstartup_error = (int *)argv[1];
            *pstartup_error = 0;
            exit(-1);
            break;
        case LOG           :
            #pragma cancel_handler(CancelHandlerForLog, cancel_code)
            resolve_user_space(instance);
            CTRACE(stderr, "HTTPD call job:.called LOG\n");
            jobs start init ();
            HTLogWriter_thread(NULL);
            abort();
            #pragma disable_handler
            break;
        case END           :
            if (resolve_user_spacel(instance)){
                exit(0);
            };
            CTRACE(stderr, "HTTPD_call_job:.called END\n");
            if (parPID>0){
                killjob(parPID);
            };
            exit(0);
            break;
        case VALIDATE      :
            server_start init("VALIDATE");
            CTRACE(stderr, "HTTFD_call_job:.called VALIDATE\n");
            jobs_start_init ();
            HTLoadGlobalAtoms_();
            do validate(argc, argv);
            return;
            break;
        default:
            {
            resolve_user space(instance);
            CTRACE(stderr, "HTTPD_call_job:.Invalid Job value: %d\n", which_job);
            abort();
            }
**********************  END HTDaemon.c (160-168)**********************
```

TABLE 7

RSLVSP Resolve User Space

```
**********************  START HTJobs. c (170-178)  **********************
PUBLIC void      resolve_user_space (char *instance) {
/* First find the jobid in the data index for this instance       */
/* Find the status of the job                     :               */
/* found the job,                                                 */
/* Make sure the job is not active                :               */
/* Get the user space                             */
/* resolve_user_space1 will return                */
/*    a return code of???? if we cannot find the space
```

TABLE 7-continued

RSLVSP Resolve User Space

```
*/
/* First find the jobid in the data index for this instance            */
/* The user may just have *USER authority, give him more authority !   */
/* Find the status of the job                     :                    */
/* Remove his added authority                                          */
/* found the job,                                                      */
/* Make sure the job is not active                :                    */
/* Get the user space                                                  */
*********************** END HTJobs.c (170–178) ***********************
```

TABLE 8A

QTMHHTTP Start Thread

```
*********************** START osthread.c (180–186) ***********************
PUBLIC THREAD_ID StartThread(THREAD_RETURN
       (* THREAD_LINKAGE routine) (void *), void *arg)
       (pthread_create(&ThreadId, PTHREAD_ATTR_DEFAULT, routine, offset))))
/* Get the Mutex, there is a window when the SSL and MAIN attempts to     */
/* spawn at the same time.                                                */
/* We need to create the symbolic link in a directory that we own, use    */
/* /QIBM/ProdData/HTTP/Protect/TC1/ICSS/QTMHHTTP                          */
/* /QIBM/ProdData/HTTP/Protect/TC1/ICSS/QTMHHTTP directory better exist,  */
/* if not, just die.                                                      */
/* unlink to cleanup just in case. Then do the syrnbolic link             */
/* If symlink fails, create a temporary directory in                      */
/* /QIBM/ProdData/HTTP/Protect/TC1/ICSS/QTMHHTTP with the current time as */
/* the name                                                               */
/* Create this new subdirectory                                           */
/* Change to this newly created directory                                 */
/* Do the symlink again                                                   */
/* If symlink fails, punt
/* The spawn needs to be done using user QTMHHTTP's profile               */
/* If the spawn was done using QSECOFR profile, the user of the spawned job */
/* is QSECOFR. However, only QTMHHTTP is authorized to used QTMHQTMP,     */
/* therefore at run time, QTMHHTTP would fail.                            */
/* Need to use QSECOFR to remove the directory and symbolic link          */
/* We are done, remove the Symbolic link. The reason no FFDC is taken for */
/* errors during unlink is that if spawn is successful, don't kill the server */
/* If a new temporary directory was created, remove that also             */
PUBLIC THREAD_ID RunOnThread( void (* THREAD LINKAGE
ppTAddr) (void *), int pTArg, THREAD_CREATE OPTION CreationOption )
{
/* if threads are disabled, return */
/* We found an idle, waiting thread...use it. */
/* givedescriptor to selected work thread */
/* We've examined the entire list, and found no active */
/* threads. What we do here depends on the creation* options.              */
/* No available threads - just fail. */
/* Wait for a thread to become available. */
/* If we couldn't use a "hot"thread, then start a new one. */
/****************************************************/
/* We check here to to see if the server is going    */
/* down If so don't dispatch any more requests.      */
/* Just go to sleep until the cancel handler kick in */
/****************************************************/
/* OsCreateEventSem always creates the semaphore in the non-posted */
/* state...so we must post it so that the thread will wake up and get */
/* to work.                                                           */
/* givedescriptor to selected work thread */
/*      If the thread creation failed, we need to clean up the already acquired */
/*      semaphore and remove the thread from the thread list.                   */
/*      Remove the semaphore for those environement that RemoveThreadFromList() */
/*      doesn't...                                                              */
*********************** END osthread.c (180–186) ***********************
```

TABLE 8B

Thread Wraper Functions

```
************************ START PTHREAD Wraper functions ********************
    int pthread_mutex_destroy(pthread_mutex_t *mutex)
    {
/*******************************************************************/
    /* Local variables */
/*******************************************************************/
        volatile error_code_t error      /* SPI error structure        */
            = { sizeof(error), 0 };
        int rc=0;
/*******************************************************************/
    /* Execute the function. */
/*******************************************************************/
        /* destroy the MI mutex */
        error.exception_id[0]= '2';      /* don't log error info, but dump it */
        rc = _DESMTX(&mutex->mutex, &QPOZ_desmtx);
        if (error.byte_available != 0) {
            rc = EINVAL;                 /* default return code if
                                          /* we take an exception */

}
        else if (rc = = EINVAL) {        /* DESMTX returns EINVAL if mutex was */
                                         /* destroyed by another process */
            rc = 0;                      /* We treat this as OK */
/*******************************************************************/
    /* Cleanup. */
/*******************************************************************/
        /*
         * Check if we were synchronously cancelled while holding the * TCBH mutex
         */
        if (rc = = 0) {
            return 0;
        }
        else {
            return -1;
        }
    }/* End of pthread_mutex_destroy */
    int pthread_mutex_init(pthread_mutex_t *mutex,
                                    pthread_mutexattr_t *attr)
    {
/*******************************************************************/
    /* Local variables */
/*******************************************************************/
        int rc;
/*******************************************************************/
    /* Execute the function. */
/*******************************************************************/
        /* only default mutex attributes are used in all cases */
        rc = EINVAL;                     /* default return code if we take an exception */
        rc = _CRTMTX(&mutex->mutex, PTHREAD_MUTEXATTR_DEFAULT);
        if (rc != 0) {
        return -1;
        }
/*******************************************************************/
    /* Cleanup. */
/*******************************************************************/
        return 0;
    }/* End of pthread_mutex_init */
    int pthread_mutex_lock(pthread_mutex_t *mutex)
/*******************************************************************/
    /* Local variables */
/*******************************************************************/
        int rc;
        volatile error_code_t error      /* SPI error structure */
            ={ sizeof(error), 0 };
/*******************************************************************/
    /* Execute the function. */
/*******************************************************************/
        rc = _LOCKMTX(&mutex->mutex, &QP0Z_lockmtx_wait);
        if (error.byte_available != 0) {  /* we took an exception */
            return -1;
        }
        else if (rc != 0)
            return -1;
        }
        else
            return 0;
    {/* End of pthread_mutex_lock */
    int pthread_mutex_trylock(pthread_mutex_t *mutex)
    {
```

TABLE 8B-continued

Thread Wraper Functions

```
/***********************************************************************/
      /* Local variables */
/***********************************************************************/
      int rc;
      volatile error_code_t error        /* SPI error structure */
         = { sizeof(error), 0 );
/***********************************************************************/
      /* Execute the function. */
/***********************************************************************/
      rc = _LOCMTX(&mutex->mutex, &QP0Z_lockmtx_nowait);
      if (error.byte_available != 0) {         /* we took an exception */
         return -1;
      }
      else if (rc = = 0)
         return 1;
      }
      else if (rc = = EDEADLK ** rc = = EBUSY) {
         return 0;
      }
      else {
         return -1;
      }
   }/* End of pthread_mutex_trylock */
   int pthread_mutex_unlock(pthread_mutex_t *mutex)
   {
/***********************************************************************/
      /* Local variables */
/***********************************************************************/
      int rc;
      volatile error_code_t error        /* SPI error structure */
         = { sizeof(error), 0 };
/***********************************************************************/
      /* Execute the function. */
/***********************************************************************/
      rc = _UNLKMTX(&mutex->mutex);
      if (error.byte_available != 0) {         /* we took an exception */
         return -1;
      }
      else if (rc != 0) {
         return -1;
      }
      else {
         return 0;
      }
} /* End of pthread_mutex_unlock */
inline pthread_t pthread self(void){
         pid_t pid;
         pid=getpid();
         return(pid);
}
inline void pthread_yield(void) {
      int seconds;
      seconds = 1;
      sleep(seconds);
}
         inline int pthread_cancel(pthread_t pid) {
         int killrc;
         killrc=kill(pid,SIGKILL);
         return(killrc);
}
inline void pthread_exit(void *status){
      int exit_rc = 0;
      exit(exit_rc);
}
int pthread_create(pid_t *Pid, pthread_attr_t *attr,
   pthread_startroutine_t routine, int arg)
{
      struct inheritance      inherit;
      const struct inheritance    *inh = &inherit;
      int vec[1]= {SPAWN_FDCLOSED};
      char                    *cenvp[1]= { NULL };
      char                    *cargv[5]= {NULL, NULL, NULL, NULL, NULL };
      int return_value=0;
      char buffer[3];
      char buffer1[11];
      *Pid=0;
      char symbolic_link[20]= "/TEMP/";
```

TABLE 8B-continued

Thread Wraper Functions

```
    memset(&inherit, 0, sizeof(struct inheritance));
    cargv[0]= fmt1_program_name;
    cargv[1]= buffer;
    cargv[2]= which instance;
    if (sc.nospawn==YES) {
        if((routine) == (HotThread)){
            CTRACE(stderr, "pthread_create:.spawn failed, nospawn requested,
            WORKER offset = %d\n", arg);
        return(return_ value);
        }
        else {
        CTRACE(stderr, "pthread_create:.spawn failed, nospawn requested\n");
            return(return_value);
        }
    }
    buffer[1]= '\0';
    strcpy(symbolic link, which instance);
    symlink(fmt1_program_name, symbolic_link);
    if ((routine) == (ssl_aixthd_server_loop)){
        buffer[0]= SSL;
        sslPID=*Pid = spawn(symbolic_link, 0, NULL, inh, cargv, cenvp);
    }
    else if((routine) == (HTDoAlarm_thread)){
        buffer[0]= ALARM;
        alarmPID=*Pid = spawn(symbolic_link, 1, vec, inh, cargv, cenvp);
    }
    else if((routine) == (HTDoGC_thread)){
        buffer[0]= GC;
        gcPID=*Pid = spawn(symbolic_link, 1, vec, inh, cargv, cenvp);
    }
    else if((routine) == (HotThread)){
        buffer[O]= WORKER;
        cargv[3]= _itoa(arg, buffer1, 10);
        *Pid = spawn(symbolic_link, 1, vec, inh, cargv, cenvp);
    }
    else if((routine) == (HTLogwriter_thread)){
        buffer[0]= LOG;
        logPID1= logPID=*Pid = spawn(symbolic_link, 1, vec, inh, cargv, cenvp);
    }
    else {
        CTRACE(stderr, "pthread_create:.invalid routine");
        return_value=-1;
    }
    if (*Pid == -1) {
        int err = errno;
        CTRACE(stderr, "pthread_create:.spawn failed, errno = %d\n", err);
        return_value=-1;
    }
        unlink(symbolic_link);
        return(return_value);
} /* End of pthread create */
************************* END PTHREAD Wraper functions *********************
```

Advantages over the Prior Art

The advantages of the system and method of the referred embodiment of this invention include the provision of: a system and method for implementing a job-based application on a threaded model; a system and method for enabling sharing of data as global values among threads within a job model; and an HTTP server implemented as jobs built on a threaded model.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. A method for porting a multi-threaded program to a job model in an application code stream, comprising the steps of:
    globalizing data that needs to be shared between different jobs by storing data in a user space accessible to all of the jobs; and
    wrappering job commands to appear as thread functions by replacing thread controls by job controls, including replacing thread function calls by job commands.
2. The method of claim 1, comprising the further steps of:
    operating a first job as a listening thread to detect a request from a client; and upon said listening thread detecting said request, passing said request to a second job wrappered as a worker thread that is waiting in a thread pool of initialized threads.

3. The method of claim 2, comprising the further steps executed during initialization of a server of:

setting the boundaries of thread jobs available to said server;

selecting an available thread job as a listener thread job to listen on a port for said request; and operating said listener thread job responsive to receiving said request to select and initialize an available thread job from said pool as a worker thread job.

4. The method of claim 3, further comprising the step of:

operating said worker thread job to process said request and respond to said client.

5. The method of claim 1, said globalizing step further comprising the steps of:

operating a first thread job to establish a first variable, storing said first variable in global variable space; and operating a second thread job to access said first variable.

6. The method of claim 5, said wrappering step further comprising the steps of:

storing job characteristics for a job identified by a job identifier;

responsive to a create thread command including a thread identifier in said application code stream, mapping said thread identifier to a corresponding job identifier; and placing in said application code stream code derived from said job characteristics accessed by said thread identifier.

7. The method of claim 1, further comprising the steps of:

spawning a plurality of jobs as worker jobs in a pool of available worker jobs;

spawning at least one job as a listener job for listening for requests from a client; and establishing a global data area for sharing global data across said jobs.

8. The method of claim 7, further comprising the steps of:

storing in said global data area global variables defined by said listener job;

operating said listener job to dispatch work to said worker job; and operating said worker job to access said global variables.

9. The method of claim 8, further comprising the steps of:

providing an external jobstruct( ) structure including a thread pool variable providing a list of worker jobs available for dispatching;

providing a table structure for holding characteristics unique to each job in said pool;

said characteristics including which worker jobs are active and for each active worker job the listener job which activated it; and operating said worker job to access said table structure for variables initialized by said listener job.

10. The method of claim 7, said spawning step being implemented as a closed spawn.

11. A system for porting a multi-threaded program to a job model, comprising:

means for globalizing data that needs to be shared between different jobs by storing data in a user space accessible to all of the jobs; and means for replacing thread controls by job controls, including replacing thread function calls by job commands wrappered to appear as functions.

12. A program storage device readable by a machine, tangibly embodying a program of instructions executable by a machine to perform method steps for porting a multi-threaded program to a job model, said method steps comprising:

globalizing data that needs to be shared between different jobs by storing data in a user space accessible to all of the jobs; and replacing thread controls by job controls, including replacing thread function calls by job commands wrappered to appear as functions.

13. An article of manufacture comprising:

a computer useable medium having computer readable program code means embodied therein for porting a multi-threaded program to a job model, the computer readable program means in said article of manufacture comprising:

computer readable program code means for causing a computer to effect globalizing data that needs to be shared between different jobs by storing data in a user space accessible to all of the jobs; and computer readable program code means for causing a computer to effect replacing thread controls by job controls, including replacing thread function calls by job commands wrappered to appear as functions.

* * * * *